Figure 8:
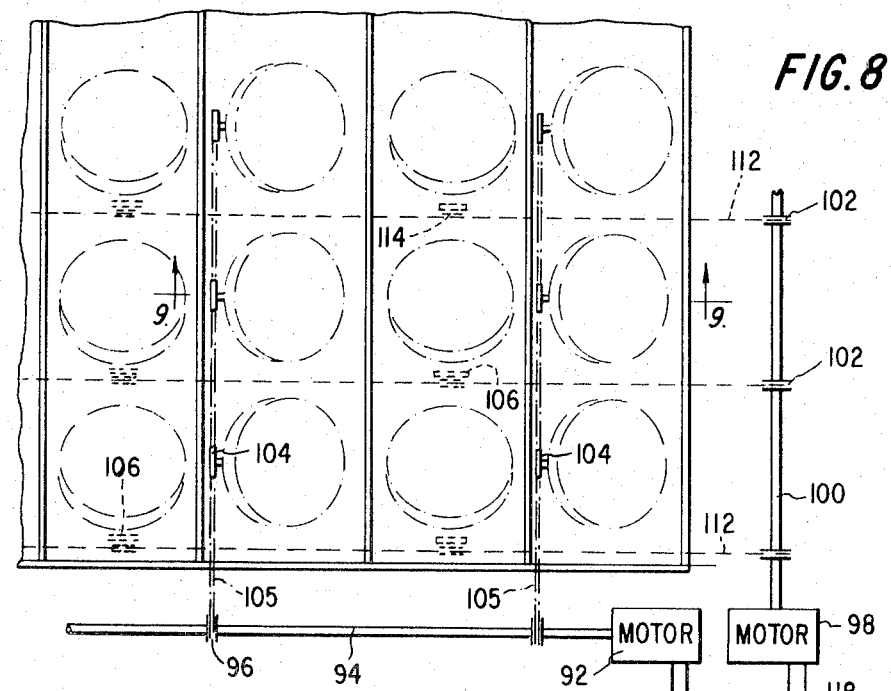

United States Patent [19]
Kornylak

[11] 3,747,736
[45] July 24, 1973

[54] LOW PROFILE CONVEYOR ROLLER

[75] Inventor: Andrew T. Kornylak, Hamilton, Ohio

[73] Assignee: Kornylak Corporation, Hamilton, Ohio

[22] Filed: May 3, 1972

[21] Appl. No.: 249,935

Related U.S. Application Data

[63] Continuation-in-part of Ser. No. 233,381, Nov. 23, 1971, which is a continuation of Ser. No. 884,173, Dec. 11, 1969, abandoned.

[52] U.S. Cl............... 198/25, 193/35 MD, 193/36, 193/37, 198/33 AB
[51] Int. Cl... B65g 47/24, B65g 13/00, B65g 13/02
[58] Field of Search..................193/35–37; 198/25, 31 AA, 33 AB

[56] References Cited
UNITED STATES PATENTS

| | | | |
|---|---|---|---|
| 2,729,321 | 1/1956 | Morrison | 193/35 R |
| 3,016,127 | 1/1962 | Cooper | 198/184 |
| 3,170,562 | 2/1965 | Eyster | 198/127 |
| 3,262,538 | 7/1966 | Englander | 193/36 |
| 3,295,660 | 1/1967 | Nelson | 198/33 AB |
| 3,295,700 | 1/1967 | Ziegler | 214/152 X |
| 3,356,236 | 12/1967 | Shaw et al. | 214/84 X |
| 3,370,685 | 2/1968 | Guilie | 193/36 |
| 3,590,970 | 7/1971 | Kornylak | 193/37 |
| 3,645,379 | 2/1972 | Kornylak | 193/37 X |

Primary Examiner—Evon C. Blunk
Assistant Examiner—W. Scott Carson
Attorney—Jay M. Cantor

[57] ABSTRACT

A multi-directional conveyor roller for use under conditions of severe height limitations. A hub carrying a plurality of rollers on the periphery is mounted to rotate in a plane making an acute angle with the horizontal. The rollers are arranged to allow the roller at the high part of the orbit to contact the conveyor load. A support wheel under the high part supports the hub during rotation.

22 Claims, 11 Drawing Figures

Patented July 24, 1973
3,747,736
5 Sheets-Sheet 1
FIG. 1
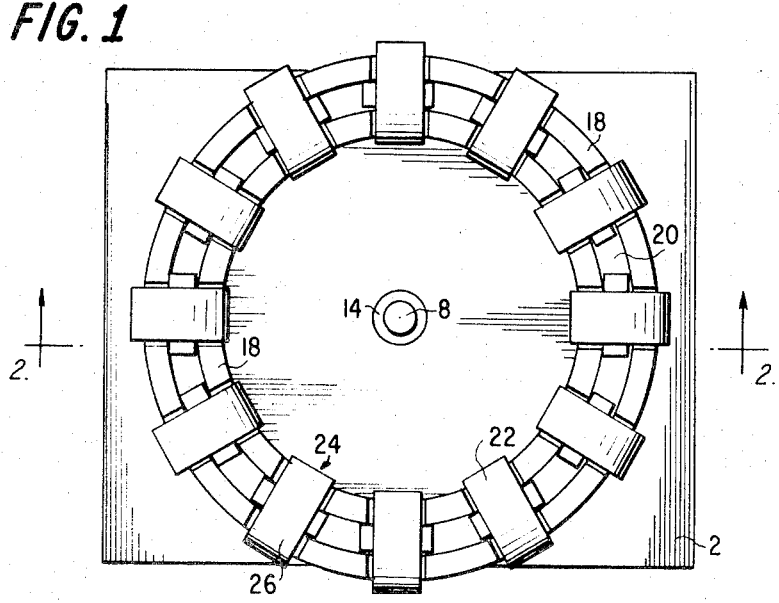
FIG. 2
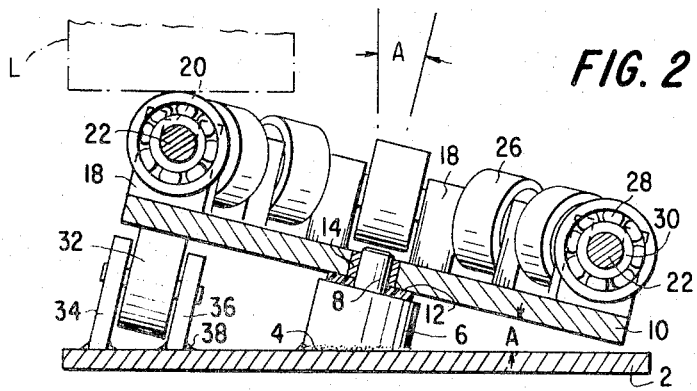
FIG. 3
FIG. 4
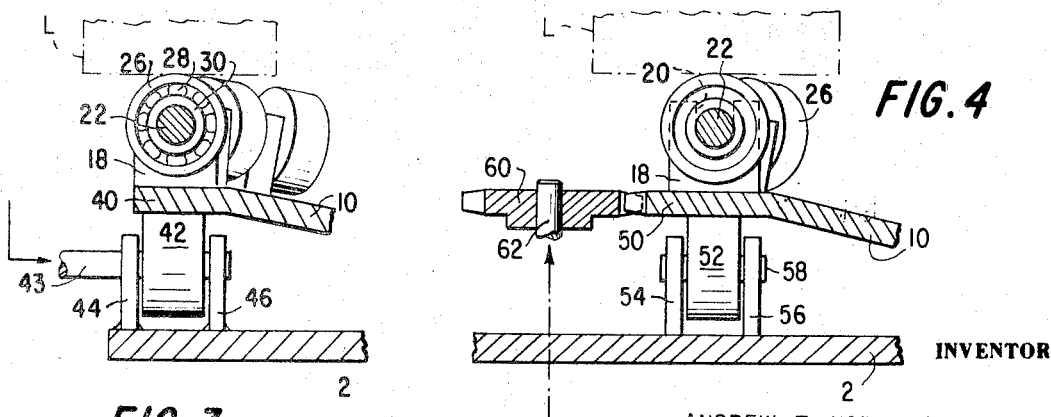
INVENTOR
ANDREW T. KORNYLAK
by Harold L. Halpert
Agent Patented July 24, 1973

3,747,736

5 Sheets-Sheet 2

INVENTOR
ANDREW T. KORNYLAK by Harold L. Halpert
Agent

Patented July 24, 1973
3,747,736
5 Sheets-Sheet 3
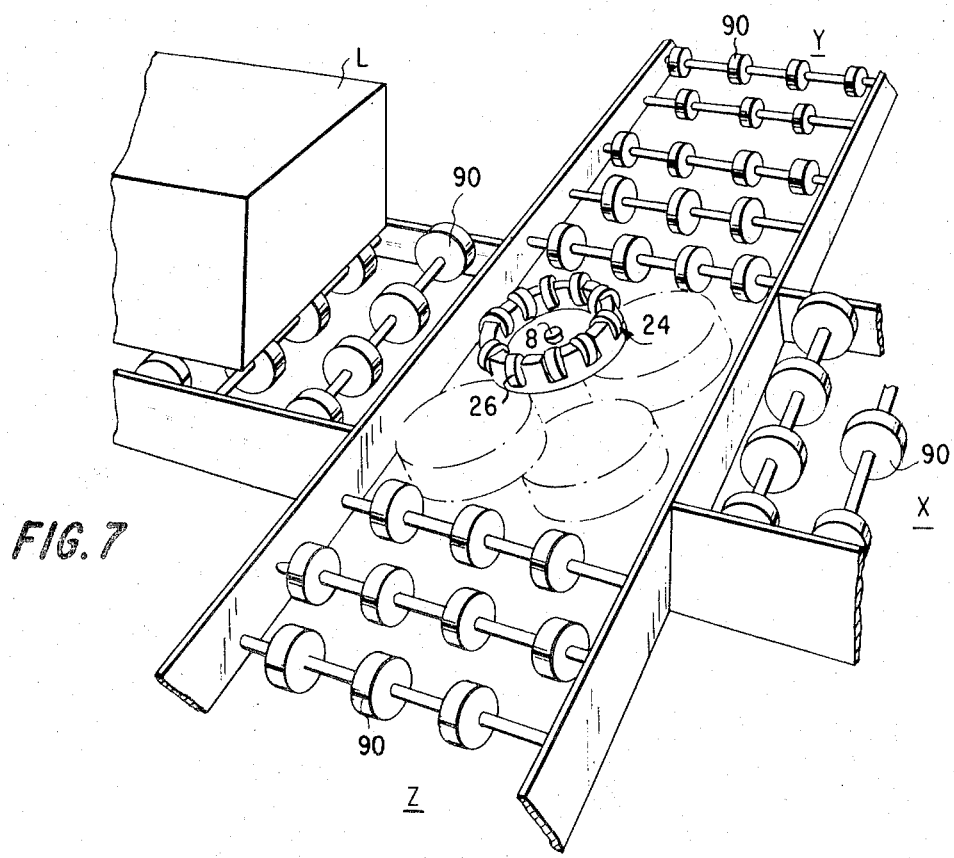
FIG. 7
FIG. 9
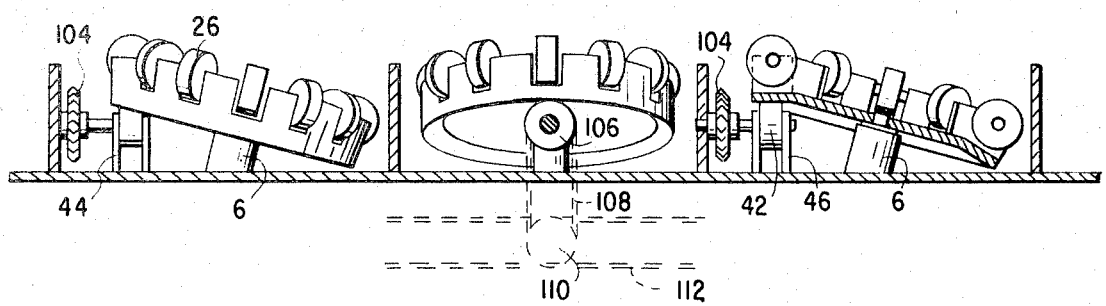
INVENTOR
ANDREW T. KORNYLAK
by Harold L. Halpert
Agent

LOW PROFILE CONVEYOR ROLLER

This is a continuation-in-part of my prior copending application Ser. No. 233,381 filed Nov. 23, 1971, which is a continuation of Ser. No. 884,173, filed Dec. 11, 1969 now abandoned.

This invention relates to a conveyor roller and more particularly to a roller for conveying a load in mutually perpendicular directions.

Conveyor rollers having the above mentioned characteristics are disclosed in U.S. Pat. Nos. 1,123,851; 2,873,021; 3,295,700 and 3,363,735 and in a German Pat. No. 502,510. These rollers comprise a hub mounted for rotations about an axis perpendicular to the plane thereof and a series of rollers carried at the periphery of the hub and mounted for rotation about axes normal to a radius of the hub. The diameter of these rollers plus the clearance necessary for mounting the rollers for rotation produces an overall height that cannot be tolerated under some conditions of intended use. It is an object of this invention to provide a conveyor roller of low profile which can be accommodated under several overall height restrictions.

It is a further object of this invention to produce a roller as aforesaid which can be power driven in order to orient a load located in an area distant from a controller station.

It is a further object of this invention to produce a roller as aforesaid which can be made of small size and great strength.

It is a further object of this invention to produce a roller as aforesaid which can be economically produced.

Figure 5:
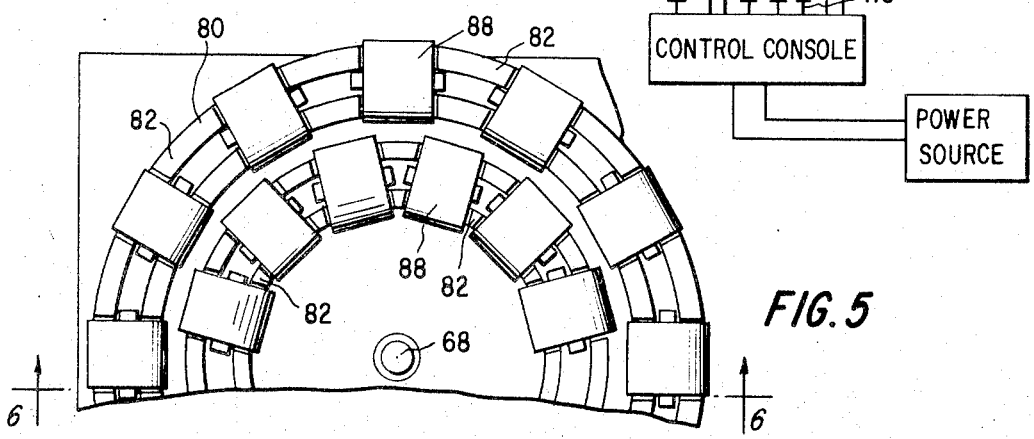
Figure 6:
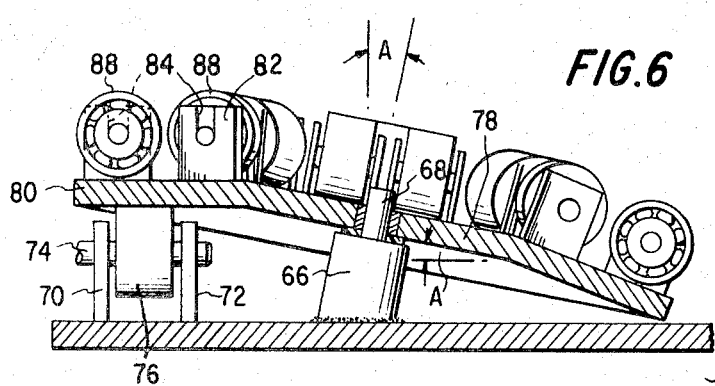
Figure 10:
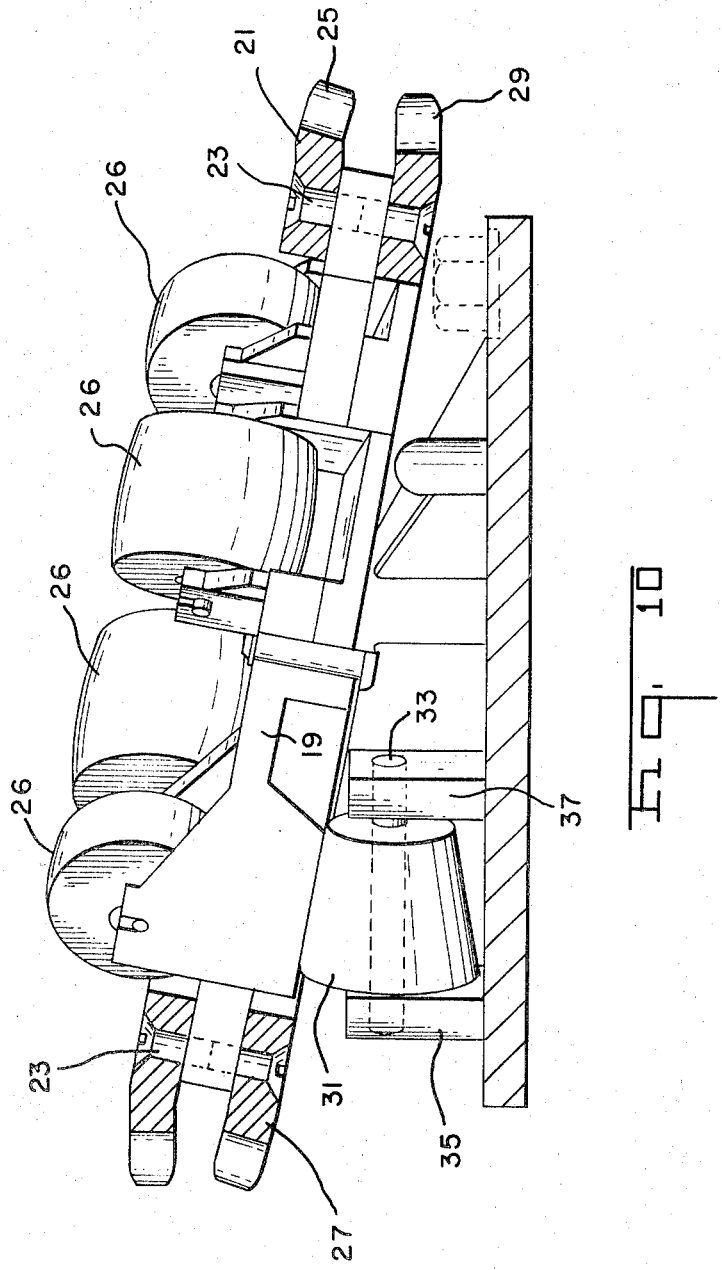
Figure 11:
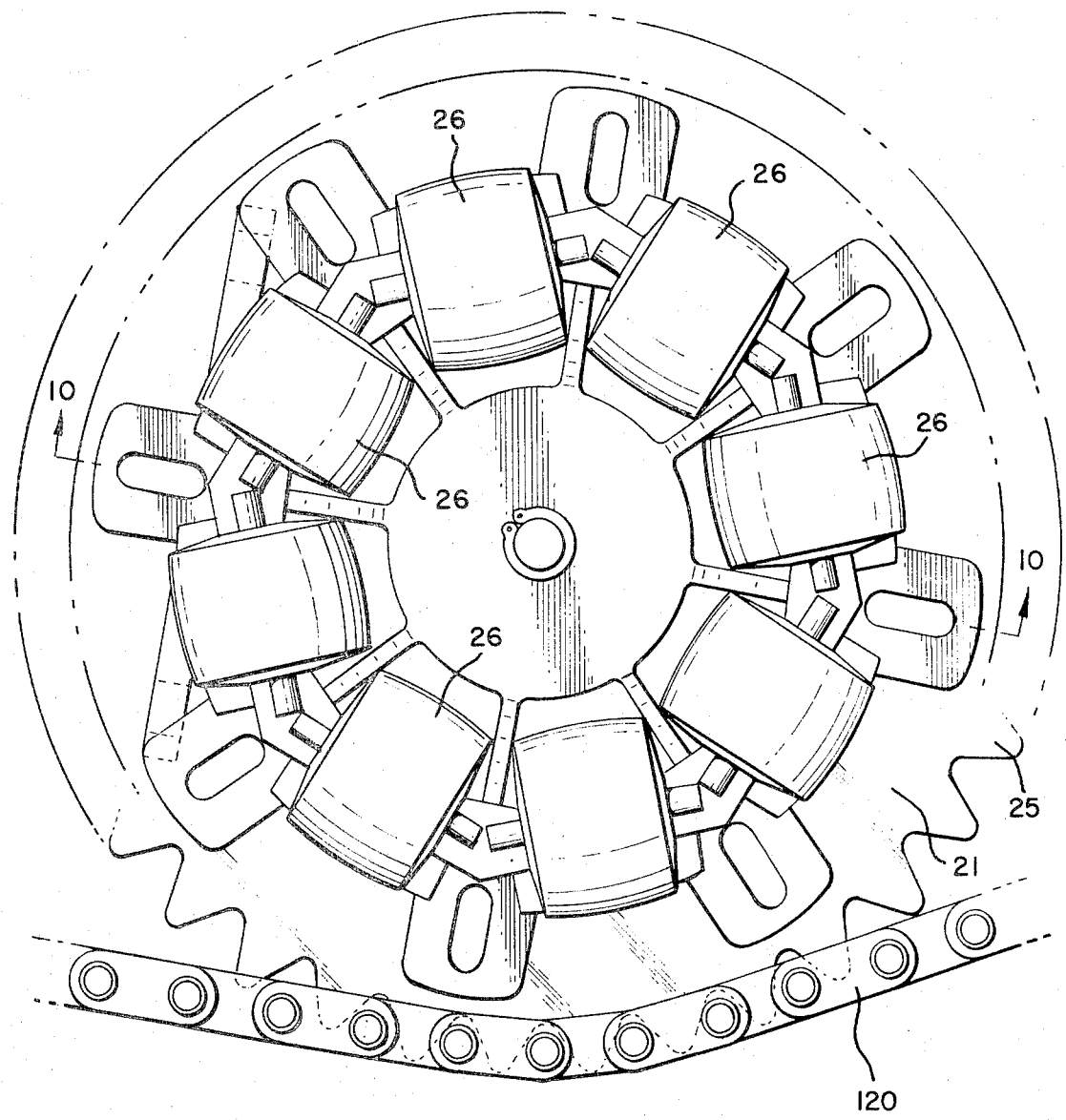

These and further objects of the invention will become manifest upon reading the following description in conjunction with the accompanying drawings wherein:

FIG. 1 is a plan view of the conveyor roll of this invention,

FIG. 2 is a view partly in section taken substantially on the line 2—2 of FIG. 1, FIG. 3 is a detail illustrating a supporting wheel and drive therefor, FIG. 4 is a detail illustrating another form of supporting wheel and drive, FIG. 5 is a plan view of another form of roll, FIG. 6 is a view taken along the line 6—6 of FIG. 5, FIG. 7 is a plan view of a transfer table with the rolls in overlapping zones, FIG. 8 illustrates another form of transfer table, and FIG. 9 is a view taken along the line 9—9 of FIG. 8, FIG. 10 is a view similar to that of FIG. 2, showing a conveyor roll provided with a sprocket about its periphery for driving engagement of a sprocket chain, FIG. 11 is a plan view of a transfer table showing a plurality of rollers as in FIG. 10 being connected to be driven by sprocket chains.

With reference to the drawing there is disclosed a conveyor roll comprising a support 2 in the form of a rectangular plate having welded thereto as at 4 a bearing support 6. A bearing 8 is secured to support 6 upon which is rotatably mounted a hub 10. A washer 12 of nylon or teflon and a bearing sleeve 14 of similar material secured in the hub provide an anti-friction mounting for the hub. The bearing is mounted at an acute angle A with reference to a normal 16 to the support to provide a mounting for the hub in a plane making an acute angle A with the support.

A plurality of annularly arranged pedestals 18 are secured to the face of the hub and formed with slots 20 to receive the bearing shafts 22 of the roller 24.

The rollers 24 in the form of the invention illustrated are similar to well known antifriction bearings comprising an outer race 26 rotatably supported by balls 28 on an inner race 30 fixed to shaft 22. However, other rollers such as disclosed in the above mentioned patents could be used.

A supporting wheel 32 is rotatably mounted between a pair of pedestals 34, 36 secured to the support as by welding 38. The wheel 32 is mounted under the roller 24 upon which the load L is carried to provide a direct support for the weight of the load on the hub and roller. This permits a more fragile structure of hub and rollers and provides a sturdy structure.

In FIG. 3 the periphery of the hub is formed with a flange 40 upon which the pedestals are mounted. A supporting wheel 42 is mounted under the flange and is secured on a shaft 43 which is rotatably mounted in pedestals 44,46 secured to the support as by welding 48. The shaft is arranged to be driven by a power source.

In FIG. 4 the hub is formed with a peripheral flange 50 upon which pedestals 18 are mounted. A supporting wheel 52 is rotatably mounted in pedestals 54,56 by a shaft 58. The periphery of flange 50 is formed with gear teeth to be engaged and driven by pinion 60. The pinion is secured to a shaft 62 which is connected to a power source (not shown).

In FIGS. 5 and 6 there is illustrated a low profile conveyor roll comprising a supporting plate 64 which is cast with a bearing mounting 66 and a bearing 68 thereon, forming an angle A with a normal 69 to the support 64, and with a pair of spaced flanges 70 and 72. The flanges are drilled to provide a pair of apertures for mounting a shaft 74 upon which is rotatably mounted a supporting wheel 76. A hub 78 is provided with a peripheral flange 80 which is formed with an annular groove 82. The groove is cast with flanges 82 formed with slots 84 arranged to receive shafts 86 carrying rollers 88. The rollers are overlapped to allow a smooth transition of the load from one roller to the next.

In FIG. 7 there is illustrated a conveyor system in which intersecting conveyors are connected by a transfer table using the low profile rolls described above. Each conveyor comprises a trackway of rollers 90 for conveying a load L. The transfer table comprises four rolls such as disclosed in FIG. 2 in which the rolls rotate in overlapping zones. The load is positioned on the transfer table and can be oriented annularly by a twisting motion and can be moved to the X conveyor by pushing it in that direction to rotate the rollers 24 and can be moved to the Y or Z conveyors by pushing it in the desired direction to thereby rotate the rolls about bearing 8 and to rotate the rollers 24 about their own axes.

In FIGS. 8 and 9 there is illustrated a section of a transfer table in which a network of rolls, such as disclosed in FIG. 3, is used to orient and move a load. The rolls in each row are oriented in the same direction with the rolls in adjacent rows being arranged with their bearings 8 tipped in planes normal to each other. The rolls in which the bearings are in parallel planes are driven by individual power sources. A fluid motor 92 drives a shaft 94 carrying sprockets 96. A fluid motor 98 drives a shaft 100 carrying sprockets 102. Sprockets 104 are driven by a chain 105 entrained over a sprocket 96 and sprockets 106 are driven by a chain 180 and sprocket 110 driven by a chain 112 entrained over sprockets 102 and 114. A control console 116 is provided with manual control buttons 118 to control the amount of fluid fed from the power source 120 to the motors to control the speed and direction of rotation of the motors. By manipulating the buttons the direction and speed of rotation of the conveyor rolls is regulated to orient the position of a load and to control the direction of discharge from the table.

In the conveyor roll shown in FIG. 10, the disc 19 mounted for rotation as in the preceeding FIGS. and supporting the rollers 26, is provided with a sprocket gear 21 secured by screws 23 to the upper surface thereof in concentric relation to its axis. The teeth 25 of the sprocket extend outwardly of the disc periphery and downwardly at an angle to the plane of its body portion such that they are in substantially a horizontal plane at the highest point in the orbit of the disc 19. A second sprocket gear 27 is secured on the bottom surface of the disc 19 concentrically therewith in a manner similar to the sprocket gear 21. The teeth 29 of gear 27 extend outwardly from the periphery of the disc but upwardly, at such an angle that the teeth are in a substantially horizontal plane at the lowest point in the orbit of the disc 19. Obviously, the sprocket gears 21 and 27 can be interchanged or each turned over from their respective positions shown in FIG. 10 so that the teeth 25 of the upper gear 21 will be horizontal at the low orbital point of the disc 10 and the teeth 29 of the lower gear 27 will be horizontal at the uppermost orbital point of the disc 19.

The disc 19 of FIG. 10 is provided with a rolling support in the form of frusto-conical roller 31 mounted for rotation on a horizontal shaft 33 which is mounted on a pair of spaced uprights 35,37 secured to the base 2. The outer periphery of the roller 31 is at the same angle to the horizontal shaft 33 as the disc and contacts under the side of the disc 19 at its highest point. The disc may also be supported by a pair of frusto-conical rollers similar to roller 31, respectively on opposite sides of the highest point of orbit of the disc.

The rolls of FIG. 10 are mounted on a transfer table in a manner similar to that shown in FIG. 8, with the discs in alternate columns having their high sides similarly oriented while the discs in alternate rows are all similarly oriented with their high sides rotated 90° from those in the columns. FIG. 11 shows the manner in which the rolls of FIG. 10 are driven by sprocket chains 120 engageable with the sprocket teeth. In this Figure, the discs 19 of the rolls are shown carrying only the sprocket gear which is to be driven by the chain, the unused gear being omitted. Since the rolls are driven by the sprocket chains at different levels respectively, for the columns and rows, the chains can cross each other without interference.

It is preferred to use metals as the material for constructing the rolls of this invention, but it is also possible to use synthetic plastics since the stresses caused by a load are small due to the arrangement of the support wheels which transfer the load forces directly to a substantial base.

What is claimed is:

1. A conveyor roll comprising a substantially horizontally extending support, a disc mounted thereon for rotation in a plane making an acute angle therewith and a plurality of rollers mounted on the face of the disc about the axis thereof for respective rotation about the axes which are respectively normal to a plane passing therethrough radially of the disc, the conveyor roll being free of any attached structure above the height of the rollers.

2. A conveyor roll as defined in claim 1 further including at least one supporting wheel mounted in supporting engagement with the disc.

3. A conveyor roll as defined in claim 2 further including means for rotating the disc.

4. A conveyor roll as defined in claim 3 wherein the means for rotating the disc comprises a shaft connected to the wheel for rotating it in frictional contact with the disc.

5. A conveyor roll as defined in claim 3 wherein the means for rotating the disc comprises gear teeth on the periphery of the disc and means in engagement with said teeth for driving the disc.

6. A conveyor roll as defined in claim 5 wherein the means in engagement with the gear teeth is a driving pinion.

7. A conveyor roll as defined in claim 5 wherein the gear teeth are the teeth of a sprocket gear and the means in engagement therewith comprises a sprocket chain.

8. A conveyor roll as defined in claim 7 wherein the teeth of the sprocket gear extend from the disc at an angle thereto so that the teeth thereof are in a substantially horizontal plane when a point on the disc reaches one of its extreme levels.

9. A conveyor roll comprising a support, a disc mounted thereon for rotation in a plane making an acute angle therewith and a plurality of rollers mounted in concentric circles about the disc axis on the face thereof for rotation about respective axes normal to a radial plane of the disc passing therethrough.

10. A conveyor roll as defined in claim 9 wherein the rollers in each circle overlap the distance between rollers on the other circle.

11. A transfer table comprising a network of rolls, a support, and means mounting said rolls for rotation about spaced fixed axes making an acute angle with a normal to the support, said rolls comprising discs having rollers mounted thereon for rotation about individual axes parallel to the disc.

12. A transfer table as defined in claim 11 wherein the zone of rotation of some of said rolls overlap the zone of rotation of the others of said rolls.

13. A transfer table comprising a network of rolls, a support, means mounting at least some of said rolls on the support for rotation about respective fixed axes making an acute angle with a normal to the support and at angles to each other, said rolls each comprising a disc provided with a plurality of rollers rotatable about respective axes parallel to the disc and angularly related to each other.

14. A transfer table as defined in claim 13 further including means for rotating some of the rolls on their respective axes.

15. A transfer table as defined in claim 14 wherein the means for rotating comprises a plurality of independent power sources and means for selectively energizing each source.

16. A transfer table according to claim 14 wherein the means for rotating some of the rolls comprises chain and sprocket means cooperating with each of the rolls to be rotated for rotating it and motive means for driving the chain and sprocket means.

17. A transfer table according to claim 16 wherein the chain and sprocket means includes a sprocket cooperating with each of the rolls for rotating it, a plurality of sprocket chains, each chain being in driving engagement with a different plurality of sprockets, the motive means comprising a separate driving means for each sprocket chain.

18. A transfer table according to claim 17 wherein at least some of the driving means are separately controllable.

19. A transfer table as defined in claim 13 further including means for rotating some of the rolls about their respective axes including a sprocket gear removably mounted on the roll concentric with its axis, said sprocket gear comprising a substantially flat ring having teeth about its periphery projecting at an angle to the plane of the plate such that the teeth at one extreme level of its orbit are in a horizontal plane for engagement with a substantially horizontally extending sprocket chain, and means for removably securing the ring to the roll with a selected side thereof adjacent a face of the disc.

20. A transfer table according to claim 19 wherein the teeth are horizontal at the uppermost level of orbit thereof when a first side of the ring is adjacent the disc.

21. A transfer table according to claim 19 in which the teeth are horizontal at the lowermost level of their orbit when the second side of the ring is adjacent the disc.

22. A transfer table according to claim 19 in which a second like sprocket gear is removably secured to the roll concentrically thereof with a face thereof adjacent the opposite face of the disc.

* * * * *